United States Patent
Zheng et al.

(10) Patent No.: US 7,790,801 B2
(45) Date of Patent: Sep. 7, 2010

(54) ORGANO-FUNCTIONAL SILICONE IN EMULSION SYSTEMS AND PROCESS FOR PREPARING SAME

(75) Inventors: Quan Zheng, Shanghai (CN); Xudong Huang, Shanghai (CN); Tiandong Li, Singapore (SG)

(73) Assignee: Momentive Performance Materials Inc., Albany, NY (US)

( * ) Notice: Subject to any disclaimer, the term of this patent is extended or adjusted under 35 U.S.C. 154(b) by 584 days.

(21) Appl. No.: 11/880,831

(22) Filed: Jul. 24, 2007

(65) Prior Publication Data

US 2009/0030148 A1   Jan. 29, 2009

(51) Int. Cl.
*C08L 83/00* (2006.01)
(52) U.S. Cl. ................................................ 524/588
(58) Field of Classification Search .................. 524/588
See application file for complete search history.

(56) References Cited

U.S. PATENT DOCUMENTS

| | | |
|---|---|---|
| 2,965,593 A | 12/1960 | Dietz |
| 3,729,444 A | 4/1973 | Bey et al. |
| 4,311,626 A | 1/1982 | Ona et al. |
| 4,366,001 A | 12/1982 | Ona et al. |
| 4,536,422 A | 8/1985 | Harper, Jr. |
| 4,584,337 A | 4/1986 | Lee et al. |
| 4,618,512 A | 10/1986 | Harper, Jr. |
| 5,516,868 A | 5/1996 | Yamazaki et al. |
| 5,753,751 A | 5/1998 | Liao et al. |
| 5,998,537 A | 12/1999 | Good et al. |
| 6,069,191 A | 5/2000 | Tanaka et al. |
| 6,071,975 A | 6/2000 | Halloran |
| 6,201,091 B1 | 3/2001 | Halloran et al. |
| 6,525,130 B1 | 2/2003 | Flowers |
| 6,863,905 B1 | 3/2005 | Shanbrom |
| 2003/0114583 A1 | 6/2003 | Stark et al. |

FOREIGN PATENT DOCUMENTS

| | | |
|---|---|---|
| EP | 191 237 | 5/1990 |
| EP | 0 399 706 | 9/1993 |
| EP | 0 705 864 A1 | 4/1996 |
| EP | 0 755 959 A2 | 1/1997 |
| EP | 0 838 547 | 4/1998 |
| EP | 1 008 617 A2 | 6/2000 |
| EP | 1 069 129 | 1/2001 |
| JP | 2001-31766 | 7/2000 |
| WO | 02/092660 | 11/2002 |

*Primary Examiner*—Edward J Cain
(74) *Attorney, Agent, or Firm*—Dominick G. Vicari

(57) ABSTRACT

The present invention provides a process for preparing substantially two-dimensional partially crosslinked organo-functional silicone in an aqueous emulsion system. The novel composition provides enhanced surface softness and smoothness to various materials.

50 Claims, No Drawings

ORGANO-FUNCTIONAL SILICONE IN EMULSION SYSTEMS AND PROCESS FOR PREPARING SAME

FIELD OF THE INVENTION

The present invention provides a process for preparing partially crosslinked organo-functional silicone in an aqueous emulsion system. In particular, the present invention is directed to a novel process and an aqueous emulsion composition that employs certain siloxanes copolymerized with alkoxy organo-functional silanes as crosslinking and chain-extending agents together an emulsion-forming amount of a surfactant mixture.

BACKGROUND OF THE INVENTION

Various agents consisting of organopolysiloxanes and silicone compound compositions have been proposed in attempts to impart pliability, smoothness, softness, slickness and other characteristics to fiber materials.

For example, U.S. Pat. Nos. 4,536,422 and 4,618,512 disclose a process, which comprises applying formaldehyde addition products with urea, cyclic urea, carbamate esters or with other amides as crosslinking agents to impart smooth-dry and flame retardant properties to synthetic-cellulose blend fabrics. However, these fabric solutions are limited by continuously releasing the formaldehyde vapor.

Examples of organo-functional silicone emulsions useful in the treatment of substrates, such as textiles, that are prepared by ring opening emulsion polymerization of organo-functional cocyclic siloxane can be found in, for example, U.S. Pat. Nos. 5,753,751 and 6,201,109 along with EP 0838547A2, JP 2001031766A, EP1069129A2, and WO2002092660A2.

Polymerized silicone fluids with hydroxy-terminated silicone fluid, ethoxy- or methoxy-terminated functional silane in a surfactant medium for use as fabric softeners and the like are disclosed in e.g., U.S. Pat. No. 6,525,130.

Organofunctional silicone emulsions have been produced by copolymerization of organofunctional group-containing ethylenically unsaturated monomers, see for example EP191237(A1); EP191237(B1); U.S. Pat. Nos. 4,584,337, 6,069,191, 5,516,868, 3,729,444, 2,965,593, and optionally with hydrolyzable silane monomers as disclosed in U.S. Pat. No. 6,863,985 and U.S. published Patent Application No. 2003/0114583A1.

Fiber treating compositions that contain at least 2 or 3 types of organofunctional siloxanes, including an amino-functional siloxane, an epoxy-functional siloxane, and a carboxyl-functional siloxane are disclosed in U.S. Pat. Nos. 4,311,626 and 4,366,001. The compositions disclosed in these patents partially crosslink on the surface of fabric after curing at high temperature.

Furthermore, partially cross-linked silicones with high molecular weight present problems in emulsification and stability. Also, linear organo-functional silicone emulsion do not provide enhanced smoothness or softness performance when used as textile finish. Emulsion systems containing amino silicone and epoxy silicone can provide partially cross-linked silicones on fabric surface after curing at high temperature, but the lifetime of the emulsion mixtures is relatively short.

The present invention fulfills the need for structured silicone emulsions that are easily and readily prepared which posses increased stability and exert enhances smoothness and softness to various materials.

SUMMARY OF THE INVENTION

The present invention is directed to an aqueous silicone-containing emulsion comprising:

a) an emulsion-forming amount of water;

b) at least one silicone possessing a substantially planar crosslinked structure;

c) an emulsion-forming amount of a surfactant mixture of at least one cationic surfactant and at least one nonionic surfactant; and, d) optionally, at least one additional component selected from the group consisting of catalysts, solvents, pH buffering agents, rewetting agents, viscosity modifiers, anti-gelling agents, perfumes, perfume carriers, fluorescers, colorants, hydrotropes, antifoaming agents, anti-redeposition agents, enzymes, optical brightening agents, opacifiers, stabilizers, emulsifiers, anti-shrinking agents, anti-wrinkle agents, fabric crisping agents, anti-spotting agents, soil-release agents, germicides, fungicides, biocides, anti-oxidants, anti-corrosion agents, preservatives, pigments, dyes, bleaches, drape imparting agents, antistatic agents fillers, thickeners, and ironing aids.

The invention further provides a method for preparing an aqueous silicone-containing emulsion comprising:

a) polymerizing a silicone possessing a substantially planar crosslinked structure in the presence of an emulsion-forming amount of water and a surfactant mixture of at least one cationic and at least one nonionic surfactant; and, b) terminating the polymerization of step (a) to provide the desired silicone-containing emulsion.

The substantially two-dimensional silicone structures of the novel aqueous silicone-containing emulsion provides particularly useful liquid silicones solution for treating fiber materials, e.g., cotton, polyesters, polyester/cotton blends, leathers and other nonwoven fabrics, to provide "a slick finish" with improved softness and smoothness to the treated material. The inventive two-dimensional structures of the invention bind with fabrics more efficiency and effectively than heretofore one and three dimensional polymerized and crosslinked silicone structures. As such, the novel composition provides enhanced surface softness and smoothness to various materials.

DESCRIPTION OF THE INVENTION

As used herein, approximating language may be applied to modify a representation that may vary without resulting in a change in the basic function to which it is related. Accordingly, a description or value modified by a term or terms, such as "substantially" may not to be limited to the precise description or value specified, in some cases. All ranges in the specifications and claims are inclusive of the endpoints and independently combinable. Numerical values in the specifications and claims are not limited to the specified values and may include values that differ from the specified value. Numerical values are understood to be sufficiently imprecise to include values approximating the stated values, allowing for experimental errors due to the measurement techniques known in the art and/or the precision of an instrument used to determine the values.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The aqueous silicone-containing emulsion of the present invention comprises a silicone possessing a substantially planar (i.e., two-dimensional) crosslinked structure. According to one embodiment of the invention, the substantially planar crosslinked silicone structure is obtained from the copolymerization of at least one cyclic and/or linear siloxane, at least one tri-alkoxysilane and at least one bi-alkoxysilane in the presence of emulsion-forming water and surfactant mixture.

The aqueous silicone-containing emulsion of the present invention is prepared by the copolymerization of cyclic and/or linear siloxanes and alkoxyl functional silanes in a surfactant medium that allows for emulsification of the substantially two-dimensional (2D) polymerized and cross-linked organofunctional silicones of the final product. The novel silicones possessing a substantially planar crosslinked structure are prepared by precisely controlling the ratio of tri-alkoxy (as crosslinking agent) and bi-alkoxy silanes (as chain-extending agent) to monomer.

The novel aqueous silicone-containing emulsions find commercial use as enhanced softness and smoothness agents for the treatment of textiles. Furthermore, as a result of the polymerization and cross-linking reaction occurring in the same medium, the reaction does not require stripping solvents, alcohols, viscosity modifiers, or other undesired diluents, and the produced emulsion avoids unstable and oiling issue.

In a particular embodiment, the present invention provides an aqueous silicone-containing emulsion and a process for producing the substantially two-dimensional ("2D") polymerized and cross-linked silicone fluids by: 1) mixing cyclic and/or linear siloxanes as monomer with multi ethoxy- or methoxy-terminated functional silane, a basic catalyst, and a surfactant mixture that contains at least one cationic surfactant and at least one nonionic surfactant; 2) heating the mixture of (1) to a temperature appropriate for the ring opening reaction of the cyclic polysiloxane monomer, and maintaining the temperature for a appropriate time until the ring opening reaction is completed and condensation between the cross-linking agents and the produced silanols occurs; 3) cooling the mixture of (2) down to about 20-25° C. and adding the bi-ethoxy or bi-methoxy silane as chain extender for the condensation of linear/crosslinked silicone to provide a high molecule weight polymer; 4) adding additionally tri-ethoxy or tri-methoxy terminated functional silane is added to the contents of the silicone mixture to increase the crosslinking level; and 5) terminating the polymerization reaction by the addition of an acid, and adding optional ingredients, e.g., biocide, to form the final product.

According to one embodiment of the invention, the cyclic siloxanes include those of the general formula:

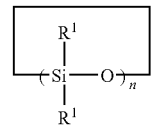

wherein n represents an integer of about 3 to about 9, preferably about 4 to about 7; and $R^1$ is independently selected from the group consisting of alkyl groups and aryl groups. Preferably, $R^1$ is independently selected from the group consisting of about 1 to 10 carbon atom saturated linear hydrocarbon radicals, about 1 to 10 carbon atoms saturated branched hydrocarbon radicals, about 6 to 12 carbon atom substituted aromatic hydrocarbon radicals, about 3 to about 10 carbon atom saturated cycloaliphatic hydrocarbon radicals, and combinations thereof. Most preferably, $R^1$ is independently selected from the group consisting of methyl and phenyl.

Examples of other cyclic siloxanes useful for the subject polymerization include the cyclic polydimethylcyclosiloxanes wherein n represents an integer of about 3 to about 9, preferably about 4 to about 7. The cyclic siloxanes include those in which n is 4 to 5, are also known as octamethylcyclotetrasiloxane (commonly referred to as "$D_4$"), and decamethylcyclopentasiloxane ("$D_5$"), respectively. These materials are also made available by Dow Corning Company as Dow Corning® 244, 245, 344, and 345 Fluids, depending on their relative proportions of $D_4$ and $D_5$. According to an embodiment, mixtures of the straight-chain and cyclic dimethyl siloxanes are also useful in preparing the aqueous silicone-containing emulsion of the present invention.

According to one specific embodiment of the invention, the cyclic siloxanes as oligomers in this invention include such oligomers as hexamethylcyclotrisiloxane ($D_3$), Octamethylcyclotetrasiloxane ($D_4$), Decamethylcyclopentasiloxane ($D_5$), dodecamethylcyclohexasiloxane ($D_6$), tetradecamethylcycloheptasiloxane ($D_7$) and mixtures thereof.

According to one embodiment of the invention cyclic siloxane are the preferred monomers to prepare the minimally crosslinked two-dimensional structures. However, it is recognized that low molecular weight poly silanol compounds can be used in addition to or in place of the cyclic siloxanes as the monomers of the inventive aqueous silicone-containing emulsion. According to one embodiment of the invention low molecular weight poly silanols that can be use in the aqueous silicone-containing emulsion include those of the general formula:

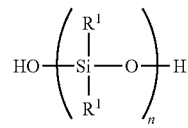

wherein $R^1$ is independently selected from the group consisting of about 1 to 10 carbon atom saturated linear hydrocarbon radicals, about 1 to 10 carbon atoms saturated branched hydrocarbon radicals, about 6 to 12 carbon atom substituted aromatic hydrocarbon radicals, about 3 to about 10 carbon atom saturated cycloaliphatic hydrocarbon radicals, and combinations thereof. Most preferably, $R^1$ is independently selected from the group consisting of methyl and phenyl.

According to another embodiment of the invention low molecular weight poly silanols that can be use in the aqueous silicone-containing emulsion include those having the formula:

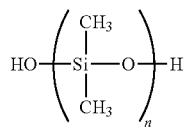

wherein n is an integer and n is greater than or equal to 3 and less than or equal 30.

Alkoxy silanes useful in this invention include a bi-alkoxy silane represented by the formula: $R^2R^3Si(OR^4)_2$ and tri-alkoxy silane represented by the formula: $R^3Si(OR^4)_3$, wherein $R^2$ and $R^4$ are unsubstituted alkyl group of the general formula: $C_aH_{2a+1}$, wherein a is an integer from 1 to 6, and $R^3$ contains functional groups such as amine or epoxy.

Specific alkoxy silanes useful include, but are not limited to, N-beta-(aminoethyl)-gamma-aminopropyl methyl dimethoxy silane, methyl trimethoxy silane, methyl triethoxy silane, gamma-glycidoxypropyl trimethoxy silane, beta-(3,4-epoxycyclohexyl)ethyl timethoxy silane, gamma-aminopropyl trimethoxy silane and mixture thereof.

A siloxane polymerization catalyst is used to prepare the substantially two-dimensional (i.e., planar) polymerized and cross-linked organo-functional silicones of the final product. The polymerization catalysts useful in the present invention include strong bases such as quaternary ammonium hydroxides, and metal hydroxides such as potassium hydroxide, sodium hydroxide and lithium hydroxide. Some examples of suitable quaternary ammonium hydroxides include but are not limited to octadecyl trimethyl ammonium hydroxide, hexadecyl trimethyl ammonium hydroxide, and tallow trimethyl ammonium hydroxide. Base catalysts such as sodium hydroxide that are not also surfactants cause in situ ion exchange with quaternary ammonium salts to form quaternary ammonium hydroxides.

The surfactant mixture of the reaction medium comprises both a cationic surfactant and a non-ionic surfactant. Cationic surfactants useful in the invention are those known in the art to be useful in stabilization of emulsions produced via emulsion polymerization. These cationic surfactants include, but are not limited to, various quaternary ammonium salts represented by the general formula:

wherein $R^5$ to $R^8$ are alkyl groups containing from 1 to 30 carbon atoms, or alkyl groups derived from tallow, coconut oil, or soy, and X is acetate, hydroxide or halogen, i.e., chlorine or bromine.

Cationic surfactants useful in the present invention include, but are not limited to, aliphatic fatty amines and their derivatives such as dodecylamine acetate, octadecylamine acetate and acetates of amines of tallow fatty acids; quaternary ammonium compounds such as tallow trimethyl ammonium chloride, dioctadecyl dimethyl ammonium chloride, didodecyldimethyl ammonium chloride and dihexadecyldimethyl ammonium chloride and the like.

The nonionic surfactants of the present are known in the art. Useful nonionic surfactants include those of the general formula:

wherein $R^9$ is a long chain alkyl group and $R^{10}$ is a hydrogen, or $CH_3$ and x is greater than or equal to 3 and less than or equal to 50.

Nonionic surfactants useful in the method of the instant invention are those that have a hydrophilic-lipophilic balance (HLB) between 10 and 20. The preferred nonionic surfactants are those, which are stable in the polymerization environment.

Specific nonionic surfactants useful in the present invention include, but are not limited to the following: 2,6,8-trimethyl-4-nonyloxypolyethylene oxyethanol (6EO) (available as TERGITOL TMN-6 by DOW CHEMICAL); 2,6,8-trimethyl-4-nonyloxypolyethylene oxyethanol (10EO) (available as TERGITOL TMN-10 by DOW CHEMICAL); alkyleneoxypolyethyleneoxyethanol (C 11-15, secondary alkyl, 7EO) (available as TERGITOL 15-s-7 by DOW CHEMICAL); alkyleneoxypolyethyleneoxyethanol (C 11-15, secondary alkyl, 9EO) (available as TERGITOL 15-s-9 by DOW CHEMICAL); alkyleneoxypolyethyleneoxyethanol (C 11-15, secondary alkyl, 15EO) (available as TERGITOL 15-s-15 by DOW CHEMICAL).

According to one embodiment of the invention, based on percentage by weight of the total emulsion solution the cyclic and/or linear siloxane(s) typically range in amount from about 10 to about 70 weight percent of the total emulsion solution. According to another specific embodiment of the invention, the cyclic siloxane(s) range in amount from about 25 to about 60 weight percent of the total emulsion solution.

According to another embodiment of the invention, the tri-alkoxy silane ranges in amount from 0.01 to 5 weight percent of the total emulsion composition, and in one specific embodiment the tri-alkoxy silane ranges in amount from about 0.1 to about 3 weight percent of the total emulsion composition.

In one embodiment of the invention the bi-alkoxy silane ranges in amount from 0.01 to 5 weight percent of the total emulsion solution and in another embodiment from about 0.1 to about 3 weight percent of the total emulsion solution.

According to one embodiment of the invention, the emulsion-forming amount of a surfactant mixture of at least one cationic surfactant and at least one nonionic surfactant ranges in amount from greater than 0 to about 40 weight percent, and in another embodiment from about 0.5 to about 30 weight percent of the total emulsion solution. According to another embodiment of the invention, the surfactant mixture is from 0.5 to 20 weight percent of the total emulsion solution. In yet another embodiment, the cationic surfactant is present in the emulsion in an amount that ranges from 0.05 to 30 weight percent, and preferably from 0.5 to 20 weight percent of the total emulsion, and the nonionic surfactant is present in the emulsion in an amount that ranges from 0.1 to 40 weight percent, and preferably from 0.5 to 30 weight percent of the total emulsion.

In one embodiment of the invention, the emulsion-forming amount catalysts typically ranges in amount from about 0.01 to about 30 weight percent of the total composition.

According to one embodiment of the invention, termination of the polymerization reaction is achieved by the addition of an acid. Typical acids for use in the reaction include those such as acetic acid, hydrochloric acid, sulfuric acid and the like.

The acids are added to the emulsion in an amount that ranges from 0.01 percent weight to 30 weight percent of the total emulsion and preferably from 0.1 to about 10 weight percent of the total emulsion.

According to another embodiment of the invention, optional ingredients include solvents such as alkanols and polyhydric alcohols, pH buffering agents such as strong or weak acids e.g. HCl, $H_2SO_4$, phosphoric, benzoic or citric acid (the pH of the compositions are preferably less than 5.0), rewetting agents, viscosity modifiers such as electrolytes, for example calcium chloride, anti-gelling agents, perfumes, perfume carriers, fluorescers, colorants, hydrotropes, antifoaming agents, anti-redeposition agents, enzymes, optical brightening agents, opacifiers, stabilizers such as guar gum and polyethylene glycol, emulsifiers, anti-shrinking agents, anti-wrinkle agents, fabric crisping agents, anti-spotting agents, soil-release agents, germicides, linear or branched silicones, fungicides, biocides, anti-oxidants, anti-corrosion agents, preservatives, pigments, dyes, bleaches and bleach precursors, drape imparting agents, antistatic agents fillers, thickeners, and ironing aids. These optional ingredients, if added, are each present in know and conventional amounts as used in the art.

In order to demonstrate the practice of the present invention, the following examples were prepared and tested as set forth below. These examples should not, however, be construed as limiting the present invention.

In each of the following examples, the amount of each component used is expressed as a weight percent as based upon the final product produced.

Example 1

The physical appearance and properties of the emulsion solution of Example 1 are displayed in Table 1 below. Example 1 was prepared as follows: 0.2% of a C-15 Secondary alcohol with 15 moles ethylene oxide (Tergitol 15-S-15, available from Dow Chemical), 2% hexadecyl trimethyl ammonium chloride (cationic surfactant 1631), 2% polyoxyethylene alkyl ether (nonionic surfactant; Emulgen 1135S-70) and 51.55% Water were charged to a 4-neck 1-liter reactor and mixed for 10 minutes under low agitation (200 rpm) with a radial flow sweep blade. Thereafter, 30% of a mixture of hexamethylcyclotrisiloxane ($D_3$), Octamethylcyclotetrasiloxane ($D_4$), Decamethylcyclopentrasiloxane ($D_5$) (DMC), was charged to the vessel and mixed for 50 minutes under high agitation (600 rpm). The pre-emulsion was homogenized with the first pressure 50 kg and the second pressure 500 kg to give an emulsion. Thereafter catalyst 1.96% of an aqueous solution of 10% NaOH in water was charged to the vessel. The vessel was then slowly heated to 80° C. and held for 5 hours, while ring opening and polymerization proceeded. The cooling of the vessel was then begun and the solution of 2% of N-beta-(aminoethyl)-gamma-aminopropylmethyl dimethoxy silane (a bi-alkoxy silane (A-2120)) in 4% water was charged. The vessel was brought to room temperature and keep at room temperature for 48 hours, while condensation reaction proceeded. Thereafter, the solution of 1.5% of gamma-aminopropyl trimethoxy silane (a tri-alkoxy silane (A-1100)) in 4.5% water was charged and keep the reaction for 60 minutes at room temperature. After 60 minutes mixing time, 0.2% Acetic Acid was charged to neutralized the catalyst. 0.09% biocide Proxel XL2(s) and 1% water were charged at last and the contents of the vessel were further mixed for one hour, after which the product was directly tested.

TABLE 1

| Appearance | White milk emulsion |
|---|---|
| Percent Nonvolatile Content | 30.00-32.00 |
| pH (100%) | 9.0-10.0 |

TABLE 1-continued

| Appearance | White milk emulsion |
|---|---|
| Viscosity (cps) | 50-80 |
| Particle Size (nanometer) | 170-210 |

Example 2

The physical appearance and properties of the emulsion solution of Example 2 are displayed in Table 2 below. Example 2 was prepared as follows: 0.2% C-15 Secondary alcohol with 15 moles ethylene oxide (Tergitol 15-S-15, available from Dow Chemical), 2% hexadecyl trimethyl ammonium chloride (cationic surfactant 1631), 2% Emulgen 1135s-70 and 51.05% Water were charged to a 4-neck 1-liter reactor and mixed for 10 minutes under low agitation (200 rpm) with a radial flow sweep blade. Thereafter, 0.5% A-163 was mixed with 30% DMC, and the mixture was charged to the vessel and mixed for 50 minutes under high agitation (600 rpm). The pre-emulsion was homogenized with the first pressure 50 kg and the second pressure 500 kg to give an emulsion. Thereafter catalyst 1.96% of an aqueous solution of 10% NaOH in water was charged to the vessel. The vessel was then slowly heated to 80° C. and held for 5 hours, while ring opening and polymerization proceeded. The cooling of the vessel was then begun and the solution of 1% A-2120 in 5% Water was charged. The vessel was brought to room temperature and keep at room temperature for 48 hours, while condensation reaction proceeded. Thereafter, the solution of 1.5% A-1100 in 4.5% Water was charged and keep the reaction for 60 minutes at room temperature. After 60 minutes mixing time, 0.2% Acetic Acid was charged to neutralized the catalyst. 0.09% biocide Proxel XL2(s) and 1% Water were charged at last and the contents of the vessel were further mixed for one hour, after which the product was directly tested.

TABLE 2

| Appearance | White milk emulsion |
|---|---|
| Percent Nonvolatile Content | 31.00-33.00 |
| pH (100%) | 9.0-10.0 |
| Viscosity (cps) | 50-80 |
| Particle Size (nanometer) | 170-210 |

Example 3

The physical appearance and properties of the emulsion solution of Example 3 are displayed in Table 3 below. Example 3 was prepared as follows: 0.2% C-15 Secondary alcohol with 15 moles ethylene oxide (Tergitol 15-S-15, available from Dow Chemical), 2% hexadecyl trimethyl ammonium chloride (cationic surfactant 1631), 2% Emulgen 1135s-70 and 49.55% water were charged to a 4-neck 1-liter reactor and mixed for 10 minutes under low agitation (200 rpm) with a radial flow sweep blade. Thereafter, 0.1% fumed silica (A-300 available from Degusa) was mixed with 30% DMC, and the mixture was charged to the vessel and mixed for 50 minutes under high agitation (600 rpm). The pre-emulsion was homogenized with the first pressure 50 kg and the second pressure 500 kg to give an emulsion. Thereafter catalyst 1.96% of an aqueous solution of 10% NaOH in water was charged to the vessel. The vessel was then slowly heated to 80° C. and held for 5 hours, while ring opening and polymerization proceeded. The cooling of the vessel was then begun and the solution of 1% A-2120 in 5% Water was charged. The vessel was brought to room temperature and keep at room temperature for 48 hours, while condensation reaction proceeded. Thereafter, the solution of 1.5% A-1100 in 4.5% Water was charged and keep the reaction for 60 minutes at room temperature. After 60 minutes mixing time, 0.2% Acetic Acid was charged to neutralized the catalyst. 0.09% biocide Proxel XL2(s) and 1% Water were charged at last and the contents of the vessel were further mixed for one hour, after which the product was directly tested.

TABLE 3

| Appearance | White milk emulsion |
|---|---|
| Percent Nonvolatile Content | 31.00-33.00 |
| pH (100%) | 9.0-10.0 |
| Viscosity (cps) | 50-80 |
| Particle Size (nanometer) | 170-210 |

Fabric Treatment and the Softness and Smoothness Test:

Testing fabrics (100% cotton woven) were treated as padding process, silicon emulsion dosage is 30 g/l, pickup rate was 100%, and dried at 130 degree for 180 sec. "Softness" and "Smoothness" were measured by KES FB2 and FB4 test equipment. The results are present in Table 4 and are represented by a coefficient of kinetic friction. The coefficient of kinetic friction is a coefficient representative of a degree of sliding (slidability) of a film.

TABLE 4

| | Softness | Smoothness (MIU*) |
|---|---|---|
| Example 1 | 0.0426 | 0.088 |
| Example 2 | 0.0448 | 0.092 |
| Example 3 | 0.0452 | 0.095 |
| Comparative Example 1 (i.e., Magnasoft ® 2059) | 0.0421 | 0.098 |
| Comparative Example 2 (i.e., Magnasoft ® 707) | 0.0396 | 0.095 |
| Comparative Example 3 (Magnasoft Plus ®) | 0.0457 | 0.095 |
| Untreated | 0.0577 | 0.164 |

*Average of kinetic friction coefficient.

While the invention has been described with reference to a preferred embodiment, those skilled in the art will understand that various changes may be made and equivalents may be substituted for elements thereof without departing from the scope of the invention. It is intended that the invention not be limited to the particular embodiment disclosed as the best mode for carrying out this invention, but that the invention will include all embodiments falling within the scope of the appended claims. All citations referred herein are expressly incorporated herein by reference.

The invention claimed is:

1. An aqueous silicone-containing emulsion comprising:
a) an emulsion-forming amount of water;
b) at least one silicone possessing a substantially planar crosslinked structure;
c) an emulsion-forming amount of a surfactant mixture of at least one cationic surfactant and at least one nonionic surfactant; and,
d) at least one additional component selected from the group consisting of pH buffering agents, rewetting agents, viscosity modifiers, antigelling agents, perfumes, perfume carriers, fluorescers, colorants, hydrotropes, antifoaming agents, anti-redeposition agents, enzymes, optical brightening agents, opacifiers, stabilizers, emulsifiers, anti-shrinking agents, anti-wrinkle agents, fabric crisping agents, anti-spotting agents, soil-release agents, germicides, fungicides, biocides, anti-oxidants, anti-corrosion agents; preservatives, pigments, dyes, bleaches, drape imparting agents, antistatic agents fillers, thickeners, and ironing aids.

2. The aqueous silicone-containing emulsion of claim 1 wherein silicone (b) is obtained from the copolymerization of (i) at least one cyclic and/or linear siloxane and (ii) at least one tri-alkoxy silane and at least one bi-alkoxy silane in the presence of emulsion-forming water (a) and surfactant mixture (c).

3. The aqueous silicone-containing emulsion of claim 2 wherein the siloxane has the general formula:

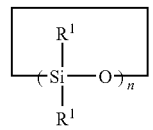

wherein n represents an integer of 3 to 9; and $R^1$ is independently selected from the group consisting of alkyl groups and aryl groups.

4. The aqueous silicone-containing emulsion of claim 2 wherein the siloxane has the general formula:

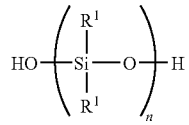

wherein $R^1$ is at least one selected from the group consisting of 1 to 10 carbon atom saturated linear hydrocarbon radicals, 1 to 10 carbon atoms saturated branched hydrocarbon radicals, 6 to 12 carbon atom substituted aromatic hydrocarbon radicals and 3 to 10 carbon atom saturated cycloaliphatic hydrocarbon radicals.

5. The aqueous silicone-containing emulsion of claim 2 wherein the cyclic siloxane is at least one selected from the group consisting of hexamethylcyclotrisiloxane ($D_3$), octamethylcyclotetrasiloxane ($D_4$), decamethylcyclopentrasiloxane ($D_5$), dodecamethylcyclohexasiloxane ($D_6$) and tetradecamethylcycloheptasiloxane ($D_7$).

6. The aqueous silicone-containing emulsion of claim 2 wherein the tri-alkoxy silane has the general formula;

wherein $R^4$ is unsubstituted alkyl groups and $R^3$ is an amine or epoxy.

7. The aqueous silicone-containing emulsion of claim 2 wherein the bi-alkoxy silane has the general formula;

wherein $R^2$ and $R^4$ are unsubstituted alkyl groups and $R^3$ is an amine or epoxy.

8. The aqueous silicone-containing emulsion of claim 1 wherein the cationic surfactant is a quaternary ammonium salt having the general formula:

wherein $R^5$, $R^6$, $R^7$, and $R^8$ are alkyl groups containing from 1 to 30 carbon atoms and X is hydroxide or halogen.

9. The aqueous silicone-containing emulsion of claim 8 wherein $R^5$, $R^6$, $R^7$, and $R^8$ are alkyl groups derived from the group consisting of tallow, coconut oil, soy and mixtures thereof.

10. The aqueous emulsion silicone-containing emulsion of claim 1 wherein the nonionic surfactant has the general formula:

$$R^9-O-(CH_2CH_2O)_x-R^{10},$$

wherein $R^9$ is a long chain alkyl group and $R^{10}$ is hydrogen or $CH_3$ and x is greater than or equal to 3 and less than or equal to 50.

11. The aqueous emulsion silicone-containing emulsion of claim 10 wherein the nonionic surfactant possesses a hydrophilic-lipophilic balance between 10 and 20.

12. The aqueous emulsion silicone-containing emulsion of claim 1 wherein the catalyst is a siloxane polymerization catalyst selected from the group consisting of base metal hydroxides and quaternary ammonium hydroxides.

13. The aqueous emulsion silicone-containing emulsion of claim 12 wherein the catalyst is at least one selected from the group consisting of potassium hydroxide, sodium hydroxide, lithium hydroxide, octadecyl trimethyl ammonium hydroxide; hexadecyl trimethyl ammonium hydroxide and tallow trimethyl ammonium hydroxide.

14. The aqueous emulsion silicone-containing emulsion of claim 2 wherein the siloxane ranges in amount from about 10 to about 70 weight percent of the total emulsion.

15. The aqueous emulsion silicone-containing emulsion of claim 2 wherein the siloxane ranges in amount from about 25 to about 60 weight percent of the total emulsion.

16. The aqueous emulsion silicone-containing emulsion of claim 1 wherein cationic surfactant ranges in amount from 0.05 to 30 weight percent of the total emulsion.

17. The aqueous emulsion silicone-containing emulsion of claim 1 wherein cationic surfactant ranges in amount from 0.5 to 20 weight percent of the total emulsion.

18. The aqueous emulsion silicone-containing emulsion of claim 1 wherein nonionic surfactant ranges in amount from 0.1 to 40 weight percent of the total emulsion.

19. The aqueous emulsion silicone-containing emulsion of claim 1 wherein nonionic surfactant ranges in amount from about 0.5 to about 30 weight percent of the total emulsion.

20. The aqueous emulsion silicone-containing emulsion of claim 2 wherein the tri-alkoxy silane ranges in amount from 0.1 to 5 weight percent of the total emulsion.

21. The aqueous emulsion silicone-containing emulsion of claim 17 wherein the bi-alkoxy silane ranges in amount from 0.1 to 5 weight percent of the total emulsion.

22. The aqueous emulsion silicone-containing emulsion of claim 1 wherein the catalyst ranges in amount from about 0.01 to about 30 weight percent of the total composition.

23. A method for preparing an aqueous silicone-containing emulsion comprising:
   a) polymerizing a silicone possessing a substantially planar crosslinked structure in the presence of an emulsion-forming amount of water and a surfactant mixture of at least one cationic and at least one nonionic surfactant; and,
   b) terminating the polymerization of step (a) to provide the desired silicone-containing emulsion,
   wherein silicone is obtained from the copolymerization of
   (i) at least one cyclic and/or linear siloxane and (ii) at least one tri-alkoxy silane and at least one bi-alkoxy silane.

24. The method of claim 23 wherein the siloxane has the general formula:

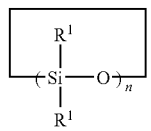

wherein n represents an integer of 3 to 9; and $R^1$ is independently selected from the group consisting of alkyl groups and aryl groups.

25. The method of claim 23 wherein the siloxane has the general formula:

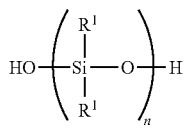

wherein $R^1$ is at least one selected from the group consisting of 1 to 10 carbon atom saturated linear hydrocarbon radicals, 1 to 10 carbon atoms saturated branched hydrocarbon radicals, 6 to 12 carbon atom substituted aromatic hydrocarbon radicals and 3 to 10 carbon atom saturated cycloaliphatic hydrocarbon radicals.

26. The method of claim 23 wherein the cyclic siloxane is at least one selected from the group consisting of hexamethylcyclotrisiloxane ($D_3$), octamethylcyclotetrasiloxane ($D_4$), decamethylcyclopentrasiloxane ($D_5$), dodecamethylcyclohexasiloxane ($D_6$) and tetradecamethylcycloheptasiloxane ($D_7$).

27. The method of claim 23 wherein the tri-alkoxy silane has the general formula:

$$R^3Si(OR^4)_2$$

wherein $R^4$ is an unsubstituted alkyl groups and $R^3$ is an amine or epoxy.

28. The method of claim 23 wherein the bi-alkoxy silane has the general formula:

$$R^2R^3Si(OR^4)_2$$

wherein $R^2$ and $R^4$ are unsubstituted alkyl groups and $R^3$ is an amine or epoxy.

29. The method claim 23 wherein the cationic surfactant is a quaternary ammonium salt having the general formula:

$$R^5R^6R^7R^8N^+X^-,$$

wherein $R^5$, $R^6$, $R^7$, and $R^8$ are alkyl groups containing from 1 to 30 carbon atoms and X is hydroxide or halogen.

30. The method of claim 29 wherein $R^5$, $R^6$, $R^7$, and $R^8$ are alkyl groups derived from the group consisting of tallow, coconut oil, soy and mixtures thereof.

31. The method of claim 23 wherein the nonionic surfactant has the general formula:

$$R^9-O-(CH_2CH_2O)_x-R^{10},$$

wherein $R^9$ is a long chain alkyl group and $R^{10}$ is hydrogen or $CH_3$ and x is greater than or equal to 3 and equal to or less than 50.

32. The method of claim 31 wherein the nonionic surfactant possesses a hydrophilic-lipophilic balance between 10 and 20.

33. The method of claim 23 further comprises a siloxane polymerization catalyst selected from the group consisting of base metal hydroxides and quaternary ammonium hydroxides and mixtures thereof.

34. The method of claim 33 wherein the catalyst is at least one selected from the group consisting of potassium hydroxide, sodium hydroxide, lithium hydroxide, octadecyl trimethyl ammonium hydroxide, hexadecyl trimethyl ammonium hydroxide and tallow trimethyl ammonium hydroxide.

35. The method of claim 23 wherein the siloxane ranges in amount from 10 to 70 weight percent of the total emulsion.

36. The method of claim 23 wherein the siloxane ranges in amount from 25 to 60 weight percent of the total emulsion.

37. The method of claim 23 wherein cationic surfactant ranges in amount from 0.05 to 30 weight percent of the emulsion.

38. The method of claim 23 wherein cationic surfactant ranges in amount from about 0.5 to about 20 weight percent of the total emulsion.

39. The method of claim 23 wherein nonionic surfactant ranges in amount from about 0.1 to about 40 weight percent of the total emulsion.

40. The method of claim 23 wherein nonionic surfactant ranges in amount from about 0.5 to about 30 weight percent of the total emulsion.

41. The method of claim 23 wherein tri-alkoxy silane ranges in amount from about 0.01 to about 5 weight percent of the total emulsion.

42. The method of claim 23 wherein the bi-alkoxy silane ranges in amount from about 0.1 to about 5 weight percent of the total emulsion.

43. A textile coated with the aqueous silicone-containing emulsion of claim 1.

44. A cotton fiber coated with the aqueous silicone-containing emulsion of claim 1.

45. A fabric coated with the aqueous silicone-containing emulsion of claim 1.

46. A non-woven fabric coated with the aqueous silicone-containing emulsion of claim 1.

47. A textile coated with the aqueous silicone-containing emulsion prepared from the method of claim 23.

48. A cotton fiber coated with the aqueous silicone-containing emulsion prepared from the method of claim 23.

49. A fabric coated with the aqueous silicone-containing emulsion prepared from the method of claim 23.

50. A non-woven fabric coated with the aqueous silicone-containing emulsion prepared from the method of claim 23.

* * * * *